Patented Oct. 19, 1948

2,452,024

UNITED STATES PATENT OFFICE 2,452,024

PREPARATION OF ALUMINUM SULFATE

William S. Wilson, Brookline, Mass., assignor to Monsanto Chemical Company, St. Louis, Mo., a corporation of Delaware No Drawing. Application October 21, 1943, Serial No. 507,181

10 Claims. (Cl. 23—123)

This invention relates to the preparation of sulfates of alumina, and particularly to the preparation of water-soluble crystals of alumina sulfate having basicities varying from neutral to about 22%.

Neutral or slightly basic sulfate is commonly prepared commercially by reacting bauxite, commercial aluminum hydrate, or other acid soluble aluminous material with sulfuric acid of 50 to 55° Bé. strength, and adding water or wash liquors in amounts sufficient to form a neutral or basic solution of aluminum sulfate. The resulting solution is subsequently boiled down, run into flat pans and allowed to cool quickly with the formation of a solid cake. This commercial product contains from 16 to 18% soluble alumina and from 40 to 45% water, and is in the form of a non-crystalline or glass-like solid solution.

If one attempts to dehydrate commercial aluminum sulfate by heating, the material softens up to a semi-fluid sticky mass. Moreover, further heating will cause fluidity throughout, with the exception of the top surface which is cooled to a temperature below the solidification point by evaporation. This results in the formation of a crust or film over the surface which increases the difficulty, both mechanically and thermally, of removing water vapor. This fluid sticky melt also tends to adhere strongly to any metallic surface, and in the course of continuous operation of the equipment will build up accretions of sulfate which require frequent removal, a factor of disadvantage in any commercial process, and especially so in this case, where the deposited material is an extremely hard cement-like structure.

The above problems can be overcome by first preparing crystals of aluminum sulfate and subjecting these to dehydration by heating. According to known methods, solutions of aluminum sulfate are concentrated by boiling until the point of saturation is reached, after which they are cooled and left to crystallize. The resulting crystals are then separated from the mother liquor and can then be readily dried to the anhydrous state. This process, however, has certain disadvantages, including particularly the difficulties involved in separating crystals from mother liquor. Moreover, the degree of crystal formation in any particular cycle is low, and as a result mother liquors must be repeatedly returned to the system in large volumes.

It is accordingly a primary object of the present invention to prepare water-soluble crystals of aluminum sulfate in a simple and direct manner, which avoids the necessity of separating mother liquor and permits the most economical use of the reacting ingredients.

A further object of the invention is to produce anhydrous aluminum sulfate from crystals prepared in the manner described herein.

The invention is carried out in general by first preparing an aluminum sulfate liquor containing from 1 to 9% $Al_2O_3$, as for example, by the commercial method previously described, and boiling down the resulting solution to produce a liquor containing from 15 to 17% $Al_2O_3$. The resulting solution or liquor is then poured into partially or completely closed pans or other suitable vessels, and allowed to stand at temperatures above that at which the amorphous solid solution will form but below the boiling point of the solution, e. g. at temperatures varying from about 75 to 105° C. depending upon the concentration of the solution being treated. By proceeding in this manner complete crystallization takes place, and a solid mass of crystals is formed.

The solution should preferably be at the highest concentration compatible with the particular temperatures used in order to obtain the highest yield of crystals. Moreover, the temperature is preferably maintained at a point nearer the solidification point than the boiling point, as this permits the speediest formation of crystals. Seed may also be added to accelerate the rate of crystallization, if desired.

The temperature of the material in the crystallizing vessel may be controlled in various ways, such as by varying the size, shape and construction of the container to insure limited heat radiating capacity. Jacketed walls may also be provided, and the temperature controlled by the use of steam, or any other suitable means may be employed for this purpose.

In the case of aluminous materials, such as hydrate of alumina, metallic aluminum, or the like, it is possible to obtain solutions having as high as 17% $Al_2O_3$ by direct reaction. In such cases, it would not be necessary to boil down.

By proceeding in the manner described above true crystals are formed which have a high melting point in comparison with the solid solutions obtained commercially. As a result, they can be dehydrated in a calcining furnace without the sticking, melting, balling and swelling tendency characteristic of the amorphous solid solutions. Moreover, by using the concentrations and crystallizing temperatures specified, a solid mass of crystals is obtained which need not be separated from mother liquor and can be readily removed from the crystallizing vessel.

A further understanding of the invention will be obtained from the following example:

A neutral aluminum sulfate solution was first prepared by dissolving bauxite with sulfuric acid of about 70% concentration, until no free acidity is present. A clear liquor was then separated from insoluble residues by settling and decantation, which liquor contained about 8.5% of $Al_2O_3$. The clear liquor was then boiled down to a concentration of about 17% alumina, and was then held in a suitable vessel at a temperature of about 104° C., which is below the boiling point but above the solidification point of amorphous solid solutions of aluminum sulfate. Upon seeding the solution and after permitting it to stand for about three hours, a solid mass of crystals formed, which was readily removed from the crystallizing vessel. The crystals were then passed through roll crushers, and fed to a counter-current direct heated calciner, in which they were retained for about 35 minutes at a temperature gradient of about 200 to 325° C. The product obtained from the calciner at the end of this time was in a substantially completely anhydrous condition and substantially free of insolubles.

It should be understood that the method of preparing the sulfate solution of 8.5% $Al_2O_3$ content described in the above example merely constitutes one conventional method of accomplishing this, and that any well-known method of treating bauxite, clay, hydrate of alumina, alum shales, or other alumina bearing material with sulfuric acid, or any other method of preparing relatively dilute solutions of neutral aluminum sulfate in water may be utilized to obtain liquors adapted to be treated in accordance with the present invention. Moreover, the strength of $Al_2O_3$ to which the starting liquor is boiled down may be varied within the limits previously specified. As the entire mass goes solid at the concentrations referred to, a crystallizing vessel should be used which permits shovelling the crystals out or removal by mechanical means.

Although the example describes the use of temperatures of about 104° C. during the crystallizing step, it is possible to use temperatures as low as 75° C. When this is done, however, a liquor of lower $Al_2O_3$ concentration, but not lower than 15% $Al_2O_3$, must be used to avoid premature solidification in the form of an amorphous solid solution.

In the example a definite period of calcination and a definite temperature gradient are also described. These may be varied rather widely, however. For example, a shorter period of calcination may be used with higher temperatures, or a longer period of calcination with lower temperatures. Thus the crystals may be heated or otherwise dehydrated in any manner capable of completely driving off water, no precautions being necessary to avoid the formation of insoluble or gummy material during the drying.

By proceeding in the various ways described herein, it is possible to readily obtain neutral aluminum sulfate in anhydrous form without forming sticky and gummy materials which render the dehydration slow and incomplete and at the same time tend to form hard cement-like deposits on the mechanical equipment used in the process. Moreover, in accordance with the invention an anhydrous product is obtained which is entirely soluble in water and therefore suitable for a wide variety of commercial uses. The product obtained is not only substantially completely devoid of water, but is of a high bulk density, which renders it superior from a commercial standpoint to both the solid solutions of commerce and the spray dried products prepared therefrom.

Although the invention has been described as applying solely to the preparation of neutral sulfates of alumina, it may be applied equally as well to basic sulfates of alumina having basicities up to 22%. When basic sulfates having basicities as high as 22% are employed, the lower limit of the $Al_2O_3$ content of the supersaturated liquor is 13%. If, however, the basicity is higher than 22% it is necessary to proceed in a different manner, for example, as described in Patent No. 2,323,499, granted to me on July 6, 1943.

Basic aluminum sulfate is aluminum sulfate which contains materially less sulfuric acid than that required by the formula $Al_2(SO_4)_3$, or which contains alumina in excess of that required by the formula $Al_2(SO_4)_3$, otherwise frequently written as $Al_2O_3.3SO_3$. It is convenient to refer to the alumina present as excess alumina in terms of basicity or percentage basicity. Thus, a product having a total alumina content of 22 parts in the hundred, of which 17 parts are required by the formula $Al_2O_3.3SO_3$ and 5 parts are in excess, may be said to have 22% total alumina and a basicity, or percentage basicity, of 22.7% ($5/22 \times 100$).

This application is a continuation-in-part of my copending application Serial No. 350,078, filed August 2, 1940, which application is now abandoned.

What I claim is:

1. The method of preparing water-soluble substantially anhydrous neutral aluminum sulfate which comprises preparing a solution of neutral aluminum sulfate containing at least 15% $Al_2O_3$, maintaining said solution at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution, and then dehydrating the resulting crystals to the anhydrous state.

2. The method of preparing water-soluble crystals of neutral aluminum sulfate which comprises preparing a solution of neutral aluminum sulfate containing from 15 to 17% $Al_2O_3$, maintaining said solution in a vessel of limited heat radiating capacity at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution, and removing the mass of crystals from said vessel.

3. The method of preparing water-soluble crystals of neutral aluminum sulfate which comprises preparing a solution of neutral aluminum sulfate containing about 17% $Al_2O_3$, adding seed to the solution, and maintaining the solution at a temperature of about 104° C. for at least three hours and until the solution has finally set to a readily disintegrable solid mass of crystals of substantially the same mass as the original solution.

4. The method of preparing water-soluble crystals of neutral aluminum sulfate which comprises preparing a solution of neutral aluminum sulfate containing from about 1 to 9% $Al_2O_3$, boiling down said solution until it contains from 15 to 17% Al₂O₃, maintaining the resulting concentrated solution in a vessel of limited heat radiating capacity at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution, and removing the mass of crystals from said vessel.

5. The method of preparing water-soluble crystals of neutral aluminum sulfate which comprises dissolving alumina bearing materials in sufficient sulfuric acid to produce an aqueous solution of neutral aluminum sulfate containing from about 1 to 9% Al₂O₃, adjusting the strength of said solution until it contains from 15 to 17% Al₂O₃, and maintaining the concentrated solution thereby obtained at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution.

6. The method of preparing water-soluble crystals of neutral aluminum sulfate which comprises dissolving bauxite in sufficient sulfuric acid of about 70% concentration to obtain an aqueous solution of neutral aluminum sulfate containing about 8.5% Al₂O₃, boiling down said solution until it contains about 17% Al₂O₃, maintaining the resulting concentrated solution in a vessel of limited heat radiating capacity at a temperature of about 104° C. for at least three hours and until the solution has finally set to a readily disintegrable solid mass of crystals of substantially the same mass as the original solution, and removing the mass of crystals from said vessel.

7. The method of preparing water-soluble substantially anhydrous neutral aluminum sulfate which comprises preparing a solution of neutral aluminum sulfate containing from 15 to 17% Al₂O₃, maintaining said solution at a temperature not less than 75° C. and above that temperature at which the amorphous solid solution of neutral aluminum sulfate will form and not higher than about 105° C. for a least three hours and until the solution has finally set to a readily disintegrable solid mass of crystals of substantially the same mass as the original solution, and then dehydrating the resulting crystals to the anhydrous state by calcining them for about 35 minutes at a temperature gradient of about 200 to 325° C.

8. The method of preparing water-soluble crystals of neutral aluminum sulfate which comprises preparing a solution of neutral aluminum sulfate containing from 15 to 17% Al₂O₃, maintaining said solution in a vessel of limited heat radiating capacity at a temperature not less than 75° C. and above that temperature at which the amorphous solid solution of neutral aluminum sulfate will form and not higher than about 105 C. for at least three hours and until the solution has finally set to a readily disintegrable solid mass of crystals of substantially the same mass as the original solution, and removing the solid mass of crystals from said vessel by mechanical means.

9. The method of preparing a substantially anhydrous mixture of water-soluble neutral and basic aluminum sulfate having an average basicity varying from neutral to 22% which comprises preparing a solution of aluminum sulfate having an average basicity within the above range and containing from 1 to 9% Al₂O₃, adjusting the concentration of said solution until it contains from 13 to 17% Al₂O₃, maintaining the resulting concentrated solution in a vessel of limited heat radiating capacity at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution, removing the mass of crystals from said vessel, crushing the crystals, and then dehydrating them to the anhydrous state.

10. The method of preparing a mixture of water-soluble crystals of neutral and basic aluminum sulfate having an average basicity varying from neutral to 22% which comprises preparing a solution of aluminum sulfate having an average basicity within the above range and containing from 13 to 17% Al₂O₃, and maintaining said solution at a temperature not less than 75° C. and above that temperature at which the amorphous solid solution of neutral aluminum sulfate will form and not higher than about 105° C. for at least three hours and until the solution has finally set to a readily disintegrable solid mass of crystals of substantially the same mass as the original solution.

WILLIAM S. WILSON.

REFERENCES CITED

The following references are of record in the file of this patent:

UNITED STATES PATENTS

| Number | Name | Date |
|---|---|---|
| 78,005 | Pemberton | May 19, 1868 |
| 257,567 | Fahlberg | May 9, 1882 |
| 1,388,436 | Moldeneke | Aug. 23, 1921 |
| 1,663,435 | Bradner | Mar. 20, 1928 |
| 2,167,238 | Griunsteinas | July 25, 1939 |

FOREIGN PATENTS

| Number | Country | Date |
|---|---|---|
| 9,545 | Great Britain | 1902 |
| 6,458 | Great Britain | 1903 |